US012394951B2

(12) United States Patent
Griepenstroh

(10) Patent No.: US 12,394,951 B2
(45) Date of Patent: Aug. 19, 2025

(54) HIGH-POWER PLUG CONNECTOR SYSTEM

(71) Applicant: HARTING ELECTRIC STIFTUNG & CO. KG, Espelkamp (DE)

(72) Inventor: Sebastian Griepenstroh, Lübbecke (DE)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 414 days.

(21) Appl. No.: 18/040,099

(22) PCT Filed: Jul. 23, 2021

(86) PCT No.: PCT/DE2021/100640
§ 371 (c)(1),
(2) Date: Jan. 31, 2023

(87) PCT Pub. No.: WO2022/022776
PCT Pub. Date: Feb. 3, 2022

(65) Prior Publication Data

US 2023/0268702 A1 Aug. 24, 2023

(30) Foreign Application Priority Data

Jul. 31, 2020 (DE) ..................... 10 2020 120 309.8

(51) Int. Cl.
*H01R 11/00* (2006.01)
*H01R 11/09* (2006.01)
(Continued)

(52) U.S. Cl.
CPC ............. *H01R 31/02* (2013.01); *H01R 11/09* (2013.01); *H01R 13/405* (2013.01);
(Continued)

(58) Field of Classification Search
CPC .... H01R 11/09; H01R 13/405; H01R 13/502; H01R 13/533; H01R 13/749
See application file for complete search history.

(56) References Cited

U.S. PATENT DOCUMENTS 6,307,749 B1 10/2001 Daanen et al.
6,786,757 B2 * 9/2004 Pocrass ................ H01R 9/0524 439/418
(Continued)

FOREIGN PATENT DOCUMENTS

CN 201466287 U 5/2010
DE 102006028319 A1 2/2007
(Continued)

OTHER PUBLICATIONS

International Preliminary Report on Patentability, dated Jan. 31, 2023, for International Patent Application No. PCT/DE2021/100640. (9 pages).
(Continued)

*Primary Examiner* — Phuong Chi Thi Nguyen
(74) *Attorney, Agent, or Firm* — Seed IP Law Group LLP

(57) ABSTRACT

A high-power plug connector system is provided having a cable connection housing for connecting at least two electric high-power plug connectors in order to transmit and/or distribute high current strengths and/or a high electric voltages, wherein the cable connection housing comprises at least one insulating body for receiving at least one high-power contact, wherein the high-power contact is designed to establish an electrically conductive connection between the at least two high-power plug connectors, and wherein the insulating body at least partially projects through at least two housing perforations of the cable connection housing into at
(Continued)

least two connecting regions of the cable connection housing, the connecting regions being designed to receive the high-power plug connector.

12 Claims, 3 Drawing Sheets

(51) Int. Cl.

| | |
|---|---|
| ***H01R 13/405*** | (2006.01) |
| ***H01R 13/502*** | (2006.01) |
| ***H01R 13/533*** | (2006.01) |
| ***H01R 13/74*** | (2006.01) |
| ***H01R 31/02*** | (2006.01) |
| *H01R 101/00* | (2006.01) |

(52) U.S. Cl.

CPC ......... *H01R 13/502* (2013.01); *H01R 13/533* (2013.01); *H01R 13/748* (2013.01); *H01R 2101/00* (2013.01); *H01R 2201/26* (2013.01)

(56) References Cited

U.S. PATENT DOCUMENTS

| | | | | |
|---|---|---|---|---|
| 6,790,049 | B2 * | 9/2004 | Kaylie | H05K 9/0056 333/100 |
| 7,351,098 | B2 * | 4/2008 | Gladd | H01R 13/6583 439/607.17 |
| 7,830,225 | B2 * | 11/2010 | Gale | H01R 24/547 333/136 |
| 10,658,794 | B2 * | 5/2020 | Zhang | H01R 24/40 |
| 12,126,125 | B2 * | 10/2024 | Niebauer | H01R 24/44 |
| 2007/0023019 | A1 | 2/2007 | Hamada et al. | |
| 2011/0028035 | A1 * | 2/2011 | McAllister | H01R 13/748 439/579 |
| 2018/0054026 | A1 | 2/2018 | Nolting et al. | |

FOREIGN PATENT DOCUMENTS

| | | | |
|---|---|---|---|
| DE | 20 2016 008 811 | U1 | 12/2019 |
| WO | 2016/110748 | A1 | 7/2016 |

OTHER PUBLICATIONS

International Search Report and Written Opinion, mailed Nov. 3, 2021, for International Patent Application No. PCT/DE2021/100640. (13 pages) (with English translation ofInternational Search Report).

Office Action, dated Feb. 8, 2021, for German Patent Application No. 10 2020 120 309.8 (8 pages).

* cited by examiner

HIGH-POWER PLUG CONNECTOR SYSTEM

BACKGROUND

Technical Field

The present disclosure is related to a high-power plug connector system. Such high-power plug connector systems are needed to transmit and/or to distribute high electrical voltages and/or high electrical currents. Particular attention is paid here to the applicability in underfloor areas of rail-bound vehicles, especially the connection of rail cars and rail carriages to each other.

Description of the Related Art

In the prior art, solutions are known which allow the transmission and/or distribution of high electrical currents and/or voltages between vehicles or between vehicles with attached modules. However, these solutions mostly provide for an unfavorable and partly non-detachable fixation of the corresponding contact elements.

A particular disadvantage of the prior art is the lack of ease of maintenance, the rigid design of the system, and the usually also high weight and considerable spatial requirement. Due to the high power requirements in modern passenger rail transport, the previous prior-art solution is outdated and inefficient. Particularly in the case of heavily stressed contact elements, such as in the field of rail-bound transport, however, repair and maintenance requirements are increasing due to ever higher demands, for example due to increased electroerosion or electrocorrosion caused by the high current strengths of over 500 A up to a few thousand amperes and voltages of over 500V up to several kilovolts.

The German Patent and Trade Mark Office has searched the following prior art in the priority application for the present application: DE 20 2016 008 811 U1, WO 2016/110748 A1, CN 201 466 287 U, DE 10 2006 028 319 A1 and U.S. Pat. No. 6,307,749 B1.

BRIEF SUMMARY

Embodiments of the invention provide a high-power plug connector system for the transmission and/or distribution of high currents and/or voltages that is as compact and versatile as possible.

One embodiment according to the invention provides for offering a high-power plug connector system having a cable connection housing for connecting at least two electrical high-power plug connectors in order to transmit and/or distribute high electrical current strengths and/or high electrical voltages. In this context, the cable connection housing comprises at least one insulating body for receiving at least one high-power contact, wherein the high-power contact is designed to establish an electrically conductive connection between the at least two high-power plug connectors, and wherein the insulating body projects at least partially through at least two housing apertures of the cable connection housing into at least two connection regions of the cable connection housing, wherein the connection regions are designed to receive the high-power plug connectors. The cable connection housing can thus be used at least as a coupling for at least two high-power plug connectors. Ideally, a cable connection housing according to the invention is formed as a distributor. In particular, the cable connection housing is formed as a Y-distributor. Advantageously, the cable connection housing is formed as a T-distributor. Further advantageously, the cable connection housing is formed as an H-distributor. It is also conceivable that the cable connection housing is formed as an X-distributor. The term "high-power plug connector" means a plug connector which is provided for connection to the cable connection housing. In particular, a high-power plug connector according to the invention is embodied as a single-pole plug connector. Such high-power plug connectors are also referred to as single-pole plug connectors. In particular, the high-power plug connector is designed to transmit a high electrical current strength and/or a high electrical voltage to the cable connection housing. The term "high electrical current strength" means a current strength in excess of 100 amperes. In particular, a current strength of more than 500 amperes is conceivable. Very particularly, a current strength of over 800 amperes is conceivable. A current strength of greater than or equal to 1,000 amperes is also conceivable. The term "high electrical voltage" means a voltage of more than 1 kilovolt. In particular, a voltage of more than 10 kilovolts is conceivable. Very particularly, a voltage of more than 15 kilovolts is conceivable. A current strength of greater than or equal to 25 kilovolts is also conceivable. The term "housing aperture" means an opening in the cable connection housing. This housing aperture leads from an interior of the cable connection housing into the surrounding exterior space. The exterior space surrounding the cable connection housing is embodied as a connection region at least in the vicinity of the housing apertures. The "connection region" is to be understood as the aforementioned exterior space of the cable connection housing. In accordance with embodiments of the invention, the connection region is formed here in such a way that a high-power plug connector is brought up to an insulating body located in a housing aperture and is connected thereto electrically conductively. By connecting a high-power plug connector to the connection region, a media-tight seal of the interior is created at the corresponding location in accordance with aspects of the invention. For this purpose, the housing of the high-power plug connector is shaped in such a way that the housing engages in a basically congruently formed connection region of the cable connection housing. In addition, sealing elements, in particular rubber-containing rings, can be used, whereby the sealing is usefully improved.

In an advantageous embodiment, the cable connection housing has at least two housing parts that are detachably connected to each other. In this way, the cable connection housing can be quickly and easily put together and dismantled for assembly and maintenance purposes. In particular, an embodiment provides for a nesting of the housing parts. In this way, a top side and a bottom side can be sealed against foreign media. Alternatively, an embodiment is conceivable which provides the housing parts as side parts which can be plugged into one another. Here, too, a sealing of the cable connection housing against foreign media is possible. In this context, foreign media means in particular fluids or foreign substances, for example water, oils or dust or other contaminants.

Another embodiment provides for embodying the high-power contact as a single electrically conductive element having at least two contact regions. In other words, an electrically conductive material is shaped in such a way that it can be engaged with at least two high-power plug connectors. An embodiment having at least three contact regions is particularly useful in this regard. Advantageously, the high-power contact may be formed as a Y-distributor.

In a further developed embodiment, the insulating body surrounding the high-power contact is integrally molded around the high-power contact. For this purpose, various primary shaping processes are available which form a plastic, in particular a dielectric plastic, around the high-power contact.

Here, the embodiment provides for forming the insulating body around the high-power contact by a spraying process.

Another embodiment proposes forming the insulating body around the high-power contact by a molding process. For example, an injection molding process may be used to form the insulating body around the high-power contact.

In an embodiment, the high-power contact has a central region which is substantially unprocessed after having been shaped. This means that the wide region for connecting the contact regions can be left substantially unprocessed, saving time and cost in the manufacturing of the high-power contact. Since the insulating body is formed around the high-power contact in a previously mentioned embodiment, there is no compelling need for further processing of the high-power contact, such as a machining or galvanizing treatment, since, for example, corrosion protection is fulfilled by the integrally molded insulating body.

In an embodiment the contact regions of the high-power contact are provided with an alloy. Since the contact regions of the high-power contact come into contact with the ambient air or a high-power plug connector, it is advisable to coat these contact regions with a corrosion-resistant alloy. Furthermore, a coating can be used that improves the electrical conductivity of the contact regions. Ideally, a coating is used on the contact regions which has both corrosion-resistant properties and improved electrically conductive properties.

In an embodiment, the cable connection housing is made of a thermally conductive material. A metal or metal alloy is particularly suitable for underfloor use, especially in rail-bound vehicles. Preferably, a steel or an aluminum alloy is used. The use of a thermally conductive plastic, in particular a thermoset, is also conceivable. By forming the cable connection housing from a thermally conductive material, it is possible to dissipate heat generated by high currents quickly to the environment of the cable connection housing. The term “environment” means in particular the ambient air. Furthermore, “environment” means a carrier component on which the cable connection housing is arranged. If a cable connection housing is used in the underfloor area of vehicles, in particular rail-bound vehicles, the resulting airstream can provide improved cooling of the high-power plug connector system.

Furthermore, an embodiment is useful in which the cable connection housing has at least two extensions which have recesses for fastening to a carrier component receiving the cable connection housing, which recesses are designed for the passage of at least one fastening element each. In other words, the cable connection housing has at least two, preferably three, conceivably also four or more extensions which have lead-throughs, for example through-openings or through-holes. Through these lead-throughs, bolts, threaded bolts, screws, pins, split pins or similar fastening elements can be inserted, which fix the cable connection housing to a carrier component, at best in a detachable manner.

An embodiment in which the extensions have at least one plane facing the top of the housing, which allows a heat-transferring connection to the receiving carrier component, is also advantageous. For this purpose, it is proposed that the plane of the extensions facing the top side of the housing be formed substantially as a flat surface, so that an advantageous connection of the cable connection housing to the carrier component can be established. If a corrosion-inhibiting or corrosion-resistant surface treatment, for example a paint finish, is used, it is proposed to leave the flat plane of the extensions untreated. In this way, heat transfer from the cable connection housing to a carrier component can be improved in a simple manner.

Lastly, one embodiment provides that the extensions have at least one plane facing the top side of the housing, allowing an electrically conductive connection to the receiving carrier component. For this purpose, it is proposed that the plane of the extensions facing the top side of the housing be embodied substantially as a flat surface, so that an advantageous connection of the cable connection housing to the carrier component can be established. If a corrosion-inhibiting, or corrosion-resistant surface treatment is used, for example a paint finish, it is proposed to leave the flat plane of the extensions untreated. In this way, a transmission of current and/or voltage from the cable connection housing to a carrier component can be improved in a simple manner. The transmission of current and/or voltage from a cable connection housing to a carrier component is particularly useful for the transmission and/or connection of an electrical shield to improve electromagnetic compatibility (EMC).

BRIEF DESCRIPTION OF THE SEVERAL VIEWS OF THE DRAWINGS

An exemplary embodiment of the invention is shown in the drawings and is explained in more detail below. In the drawings.

The figures may contain partially simplified, schematic representations. In part, identical reference signs are used for like but possibly non-identical elements. Different views of like elements could be scaled differently. Directional indications such as “left,” “right,” “top,” and “bottom” are to be understood with reference to the figure in question and may vary in the individual representations with respect to the object shown.

DETAILED DESCRIPTION

Figure 1:
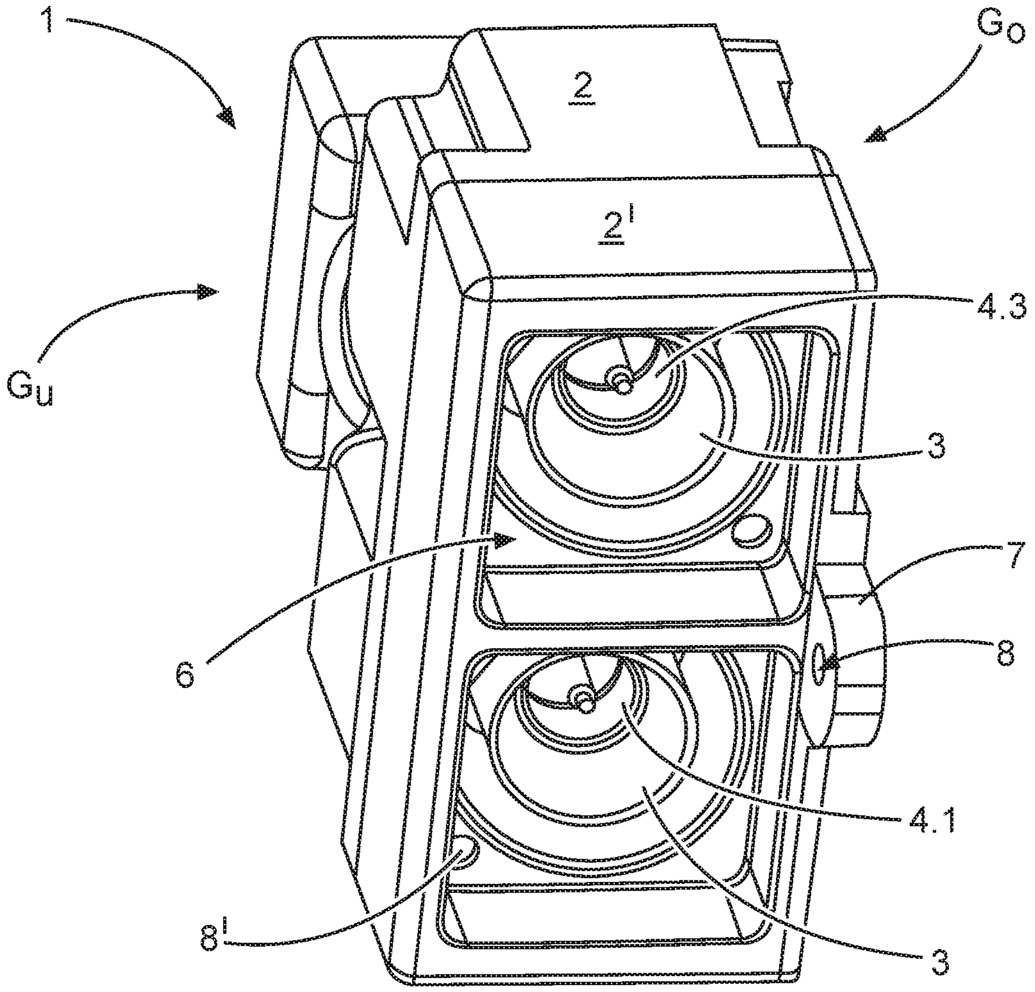
FIG. 1 shows a perspective view of a high-power plug connector system.

FIG. 1 shows a cable connection housing 1 of a high-power plug connector in a perspective view looking at the housing underside $G_U$. The cable connection housing 1 consists here of two mutually engaging housing parts 2 and 2'. An insulating body 3 is arranged in the cable connection housing 1 and receives a high-power contact 4, wherein two contact regions 4.1 and 4.3 can be seen in FIG. 1. The insulating body 3 and the contact regions 4.1 and 4.3 project into a connection region 6 for high-power plug connectors (not shown). The connection region 6 has at least one, advantageously at least two recesses 8', which are embodied as blind holes with threads. This allows corresponding high-power plug connectors to be detachably connected to the cable connection housing 1 by using threaded pins, screws or similar fastening elements. For fastening the cable connection housing 1, there are extensions 7 on the side of the cable connection housing 1 facing the housing top side Go. These extensions 7 are each embodied with at least one recess 8, wherein the recesses 8 are embodied as through-openings or through-holes. With the aid of these extensions 7, the cable connection housing 1 can be fastened to a carrier component, for example the floor of a vehicle, in particular a rail-bound vehicle. Screws, threaded pins, bolts or comparable fastening elements can be used for this purpose.

Figure 2:
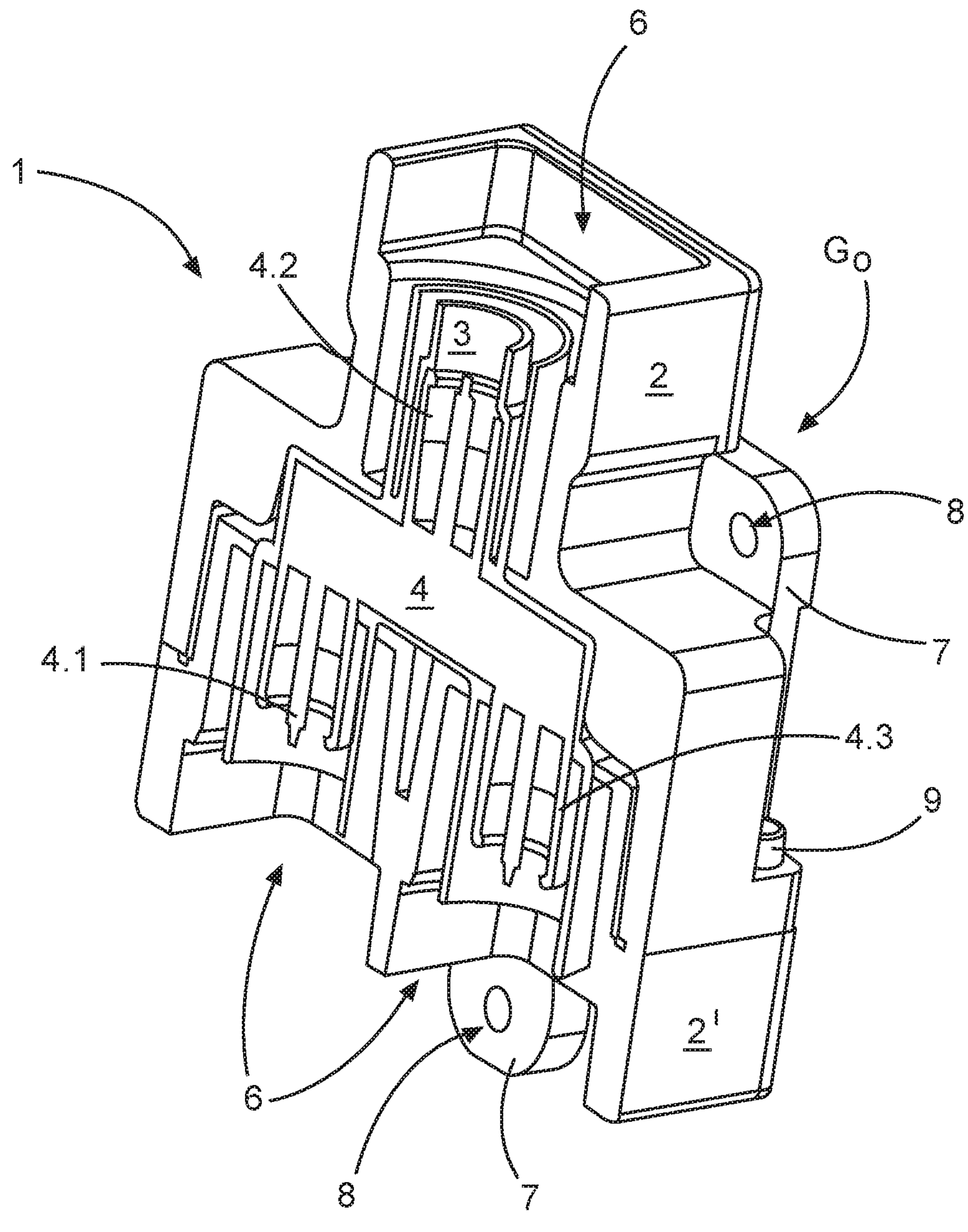
FIG. 2 shows a perspective view of a high-power plug connector in a sectional view.

A view of the interior of the cable connection housing 1 for a high-power plug connector system is disclosed in FIG. 2. It is clear here that the exemplary embodiment shown has two connection regions 6 on the housing part 2' of the cable connection housing 1. Furthermore, it can be seen that the housing part 2 of the cable connection housing 1 in the exemplary embodiment has a further connection region 6. Thus, a "Y-distributor" is formed. The housing parts 2 and 2' engage with one another in such a way that a nesting of the housing parts 2 and 2' is created, whereby, among other things, an improved sealing of the cable connection housing 1 against foreign media can be achieved. The use of additional sealing elements, for example in the form of rubber seals, further improves this sealing effect. The term "foreign media" means in particular fluids such as water and oil, but also dust and similar contaminants. It can be seen that the housing part 2 is detachably fixed to the housing part 2 by fastening elements 9. In the case shown, the fastening element 9 is a hexagon socket screw. Other fastening elements, in particular alternative embodiments of screws, are known to a person skilled in the art. In addition, FIG. 2 clearly shows that both housing part 2 and housing part 2' have at least one extension 7 with associated recess 8. It makes sense that the housing part 2 in particular has two extensions 7, wherein one extension 7 is concealed by the housing part 2 in the illustration. The non-visible extension 7 is thus located mirror-symmetrically to the extension 7 on the housing part 2. The insulating body 3 is formed around the one-piece high-power contact 4. In this case, the insulating body 3 exposes the high-power contact 4 only at the contact regions 4.1 and 4.3, as well as in parts at the contact region 4.2. In the illustrated exemplary embodiment, the contact regions 4.1 and 4.3 differ from the contact region 4.2. An alternative embodiment provides for the contact regions 4.1, 4.2 and 4.3 to be identical, which can considerably simplify the fitting or the assembly. In the exemplary embodiment shown, the different design of the contact regions 4.1 and 4.3 compared to the contact region 4.2 means that protection against incorrect plugging is provided. This means that high-power plug connectors intended for plugging with contact region 4.2 do not fit on the contact regions 4.1 and 4.3, and vice versa.

Figure 3:
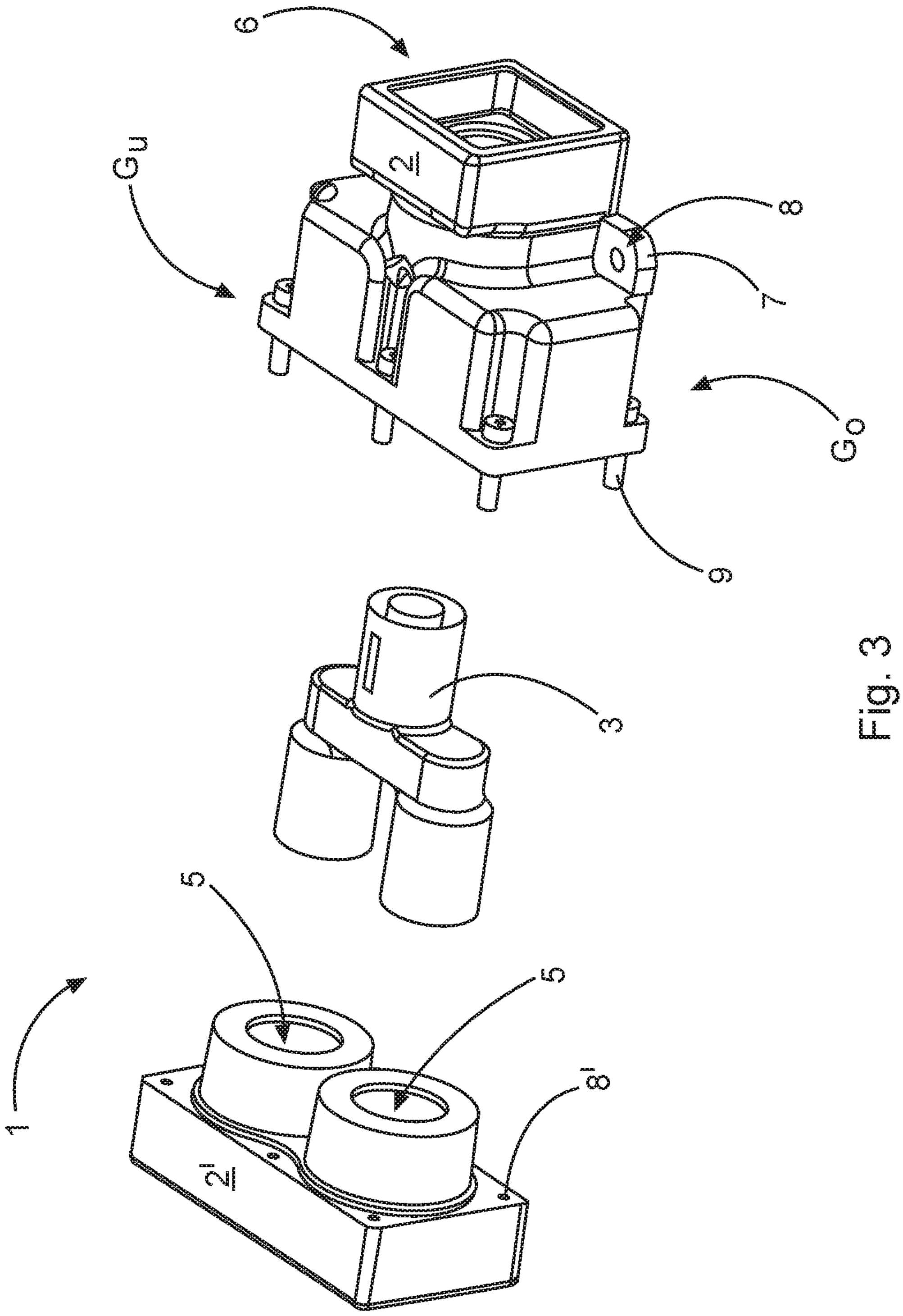
FIG. 3 shows a perspective exploded view of a high-power plug connector.

The simple assembly of the illustrated embodiment of the cable connection housing 1 can be seen in FIG. 3. Starting from the right side of FIG. 3, the first housing part 2 is equipped with fastening elements 9. An insulating body 3 shown in the middle with a high-power contact 4 located therein is inserted into the housing part 2. For this purpose, the housing part 2 has a housing aperture, comparable to the shown housing apertures 5 of the housing part 2'. The housing part 2' is then guided to the housing part 2 via the insulating body 3. In the process, the insulating body 3 is guided through the housing apertures 5. The "Y-distributor" design also prevents twisting of the high-power contact 4 or of the insulating body 3 receiving the high-power contact. The housing part 2' has recesses 8' corresponding to the fastening elements 9 of the housing part 2. The fastening elements 9 are now inserted into the recesses 8' of the housing part 2, in the shown exemplary embodiment as a blind hole with internal thread, and fastened or screwed there.

Even though various aspects or features of the invention are shown in each case combination in the figures, it is apparent to a person skilled in the art—unless otherwise indicated—that the combinations shown and discussed are not the only possible ones. In particular, corresponding units or feature complexes from different exemplary embodiments may be interchanged with each other. In other words, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure

The invention claimed is:

1. A high-power plug connector system, comprising: a cable connection housing for connecting at least two electrical high-power plug connectors in order to transmit and/or distribute high electrical current and/or high electrical voltages, wherein the cable connection housing comprises at least one insulating body for receiving at least one high-power contact, wherein the high-power contact is designed to establish an electrically conductive connection between the at least two high-power plug connectors, and wherein the insulating body projects at least partially through at least two housing apertures of the cable connection housing into at least two connection regions of the cable connection housing, and wherein the connection regions are designed to receive the high-power plug connectors.

2. The high-power plug connector system as claimed in claim 1, wherein the cable connection housing has at least two housing parts that are detachably connected to each other.

3. The high-power plug connector system as claimed in claim 1, wherein the high-power contact is embodied as a single electrically conductive element having at least two contact regions.

4. The high-power plug connector system as claimed in claim 1, wherein the insulating body surrounding the high-power contact is integrally molded around the high-power contact.

5. The high-power plug connector system as claimed in claim 1, wherein the insulating body is formed around the high-power contact by a spraying process.

6. The high-power plug connector system as claimed in claim 1, wherein the insulating body is formed around the high-power contact by a molding process.

7. The high-power plug connector system as claimed in claim 1, wherein the high-power contact has a central region which is substantially unprocessed after having been shaped.

8. The high-power plug connector system as claimed in claim 1, wherein the contact regions of the high-power contact are provided with a corrosion-resistant alloy.

9. The high-power plug connector system as claimed in claim 1, wherein the cable connection housing is made of a thermally conductive material.

10. The high-power plug connector system as claimed in claim 1, wherein the cable connection housing has at least two extensions, which have recesses for fastening to a carrier component receiving the cable connection housing, which recesses are designed for the passage of at least one fastening element each.

11. The high-power plug connector system as claimed in claim 1, wherein the extensions have at least one plane facing a-the-top side of the housing, allowing a heat-transferring connection to the receiving carrier component.

12. The high-power plug connector system as claimed in claim 1, wherein the extensions have at least one plane facing a top side of the housing, allowing an electrically conductive connection to the receiving carrier component.

* * * * *